United States Patent
Borchert et al.

(10) Patent No.: US 7,906,062 B2
(45) Date of Patent: Mar. 15, 2011

(54) PROCESS FOR THE PRODUCTION OF HOLLOW BODIES OF THERMOPLASTIC MATERIAL BY EXTRUSION BLOW MOLDING

(75) Inventors: Matthias Borchert, Bonn (DE); Gerd Wolter, Konigswinter (DE); Harald Lorenz, Bad Neuenahr-Ahrweiler (DE); Dirk Eulitz, Bonn (DE); Timo Kramer, Hirz-Maulsbach (DE); Thomas Froitzheim, St. Augustin (DE); Joachim Eckhardt, Bonn (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 393 days.

(21) Appl. No.: 11/760,560

(22) Filed: Jun. 8, 2007

(65) Prior Publication Data

US 2009/0102102 A1   Apr. 23, 2009

Related U.S. Application Data

(60) Provisional application No. 60/806,489, filed on Jul. 3, 2006.

(30) Foreign Application Priority Data

Jun. 9, 2006   (DE) .......................... 10 2006 027 254

(51) Int. Cl.
   *B29C 49/04*   (2006.01)
(52) U.S. Cl. ......... 264/424; 264/545; 264/553; 264/248; 264/250; 425/463; 425/466
(58) Field of Classification Search .................. 264/454, 264/540, 541, 171.1, 171.11, 171.12, 250, 264/545, 516, 553, 571, 248; 425/463, 462, 466, 504; 156/244.12–244.14
See application file for complete search history.

(56) References Cited

U.S. PATENT DOCUMENTS

| 1,400,146 | A | * | 12/1921 | Eggers et al. ................. 156/196 |
| 3,234,594 | A |   | 2/1966  | Winstead |
| 3,681,486 | A | * | 8/1972  | Mehnert ....................... 264/529 |

(Continued)

FOREIGN PATENT DOCUMENTS

AT   225919   2/1963

(Continued)

OTHER PUBLICATIONS

International Search Report and Written Opinion dated Oct. 15, 2007 issued in related International Patent Application No. PCT/EP2007/004549.

(Continued)

*Primary Examiner* — Kat Wyrozebski
*Assistant Examiner* — Scott W Dodds
(74) *Attorney, Agent, or Firm* — Grossman Tucker Perreault & Pfleger, PLLC (57) ABSTRACT

The invention concerns a process for the production of hollow bodies of thermoplastic material by extrusion blow molding. In the process according to the invention continuous extrusion of at least two preforms in web form of plasticized material is effected by means of a plurality of extrusion devices. The preforms are jointly shaped to form a hollow body in the still plastic condition, that is to say in the first heat, within a multi-part tool forming a mold cavity. In that case a wall thickness profile is imparted to at least one preform during the extrusion operation independently of the respective other preform by continuous nozzle gap adjustment during the extrusion operation.

7 Claims, 8 Drawing Sheets

U.S. PATENT DOCUMENTS

| | | | |
|---|---|---|---|
| 3,912,436 A | 10/1975 | Bailly | |
| 3,933,967 A * | 1/1976 | Taylor | 264/248 |
| 4,572,394 A * | 2/1986 | Tanahashi et al. | 220/86.2 |
| 4,874,566 A * | 10/1989 | Heuschkel | 264/412 |
| 4,952,347 A * | 8/1990 | Kasugai | 264/457 |
| 5,114,767 A * | 5/1992 | Berns et al. | 428/35.7 |
| 5,800,051 A | 9/1998 | Gampe | |
| 6,099,290 A | 8/2000 | Gross | |
| 6,372,176 B1 * | 4/2002 | Ekendahl et al. | 264/545 |
| 6,814,921 B1 | 11/2004 | Van Schaftingen et al. | |
| 2003/0164572 A1 | 9/2003 | Pappert et al. | |
| 2004/0241386 A1 * | 12/2004 | Polk et al. | 428/113 |

FOREIGN PATENT DOCUMENTS

| | | |
|---|---|---|
| DE | 1779463 | 8/1968 |
| DE | 1479242 | 1/1969 |
| DE | 1704467 | 3/1971 |
| DE | 19535930 | 1/1997 |
| DE | 10010900 | 9/2001 |
| DE | 10205524 | 8/2003 |
| DE | 10231866 | 1/2004 |
| FR | 1166775 | 11/1958 |
| JP | 05229015 | 9/1993 |
| JP | 2006068930 | 3/2006 |
| WO | 2004007182 | 1/2004 |

OTHER PUBLICATIONS

Essay and English language translation of essay, cited in notice of opposition in German Application No. DE 10 2006 027 254.4, 2002.

* cited by examiner

PROCESS FOR THE PRODUCTION OF HOLLOW BODIES OF THERMOPLASTIC MATERIAL BY EXTRUSION BLOW MOLDING

CROSS-REFERENCE TO RELATED APPLICATIONS

This application claims priority to German Application DE 10 2006 027 254, filed Jun. 9, 2006 and to U.S. Provisional Application 60/806,489 filed Jul. 3, 2006.

FIELD

The invention concerns a process for the production of hollow bodies of thermoplastic material by extrusion blow molding.

BACKGROUND

It is basically known for hollow bodies such as for example fuel tanks, drums or heating oil tanks to be produced from plastic material by extrusion blow molding.

In that case generally granulated thermoplastic material is plasticized in one or more extruders and fed to an extrusion head. The plasticized material is expelled from the extrusion head in the form of a tubular preform which is either removed at the extrusion head and introduced by means of manipulators into an opened mold tool or is extruded into the mold tool in a hanging condition directly at the extrusion head. The mold tool generally comprises two mold halves forming a mold cavity defining the external contour of the finished blow-molded article. The preform is expanded within the mold cavity by means of gas pressure and/or by means of a reduced pressure. The finished article is of an external contour corresponding to the contour which is predetermined by the mold cavity of the tool.

It is equally known for a tubular preform, after extrusion, to be cut up to the intended final length into one or more material webs and for those material webs to be transported by means of a gripper into position between the opened halves of a tool.

Finally it is also known for preforms in web form or band form to be expelled from extruders with wide-slot nozzles and for the preforms to be shaped in some manner in the first or second heat to afford the definitive configuration of the finished product.

When dealing with articles of a comparatively complicated external contour a tubular preform is generally extruded. In that situation the material which is extruded at the extrusion head in a hanging condition experiences a certain amount of stretch by virtue of its length-related weight. If no measures are taken to compensate for that stretch, that results in a differing wall thickness distribution on the finished product, in the extrusion direction. When dealing with molten materials of comparatively low viscosity that can be counteracted by means of discontinuous extrusion.

It is easy to envisage that articles of a comparatively complex external configuration experience different degrees of stretching upon expansion at various locations within the blow molding mold so that this factor alone results in differing wall thickness distribution. In the production of certain products different wall thicknesses on the finished product are desirable, whereas other products require different wall thickness profiles for reasons of stability in the finished product. Finally it is known for the wall thickness of the extruded preform to be varied in such a way that differing degrees of stretch are compensated upon expansion of the preform. Critical articles in that respect are transparent detergent containers, canisters with handles shaped therein and so forth.

For that purpose it is known for a wall thickness profile to be imparted to tubular preforms, more specifically both axially and also radially. That is implemented for example by adjustment of the annular gap at the extrusion head. In the case of very large products wall thickness control is also used to compensate for the lengthwise stretch of the tube in the extrusion procedure.

It is also desirable in the case of relatively large products such as for example in the case of fuel tanks of plastic material to impart to the preform a wall thickness which varies over the length and/or periphery thereof, so that differing degrees of stretch in the tool can be compensated or it is possible to achieve a different wall thickness distribution on the finished product. It is conceivable for example that, in the case of a fuel tank, a different wall thickness distribution is to be provided for reasons of stability in order to be able to better accommodate any impact-induced deformation.

Therefore the object of the present invention is to provide a process for the production of an extrusion blow molded container of thermoplastic material, which entails very substantial freedom in terms of variation in the wall thickness of the container in any direction.

SUMMARY

That object is attained by a process for the production of hollow bodies of thermoplastic material by extrusion blow molding, in which extrusion of at least two preforms in web form of plasticized material is effected by means of a plurality of extrusion devices, wherein the preforms are jointly shaped in the first heat, that is to say in the still plastic condition, within a multi-part tool forming a mold cavity to provide a hollow body and wherein a wall thickness profile is imparted to at least one preform during the extrusion operation independently of the respective other preform by continuous nozzle gap adjustment during extrusion.

Preferably at least two preforms in web form are extruded continuously. If the hollow body to be produced is for example a fuel tank, it may be advantageous for the preforms to be produced from a multi-layer co-extrudate with barrier layers for hydrocarbons, for example in the form of EVOH or the like.

In contrast to the previously known processes for wall thickness control in respect of tubular preforms, it is possible with the process according to the invention to produce a hollow body having two regions with respectively different wall thickness profiles. In the extrusion of a tubular hollow body, radial and/or axial wall thickness adjustment results in influencing the entire extrudate over the entire periphery thereof. With the process according to the invention two preforms respectively forming a hollow body can be influenced independently of each other, wherein it is possible to impart to at least one preform, during the extrusion operation, a wall thickness profile which is different from the respective other preform. That has the advantage that the process according to the invention also makes it possible to produce large and complex products involving any wall thickness variation in any direction.

Desirably wall thickness control is effected in each case in accordance with a predetermined program.

In a preferred variant of the invention it is provided that a wall thickness profile is imparted to the preforms or at least one preform in the extrusion direction and/or transversely with respect to the extrusion direction.

Desirably the preforms are expanded within the tool by an increased internal pressure and/or a reduced external pressure.

Preferably the shaping operation is effected within a three-part tool in a two-stage mode, wherein in a first step the preforms are respectively caused to bear against a contour forming a portion of the mold cavity by means of increased pressure and/or reduced pressure and are shaped out and in a second step the intermediate products respectively forming portions of the hollow body are joined together to provide the finished product.

Preferably the preforms are extruded from extrusion devices arranged in mutually parallel relationship and having wide-slot nozzles in a hanging condition (in the direction of the force of gravity).

Preferably extrusion of the preforms is effected synchronously in respect of the extrusion speed. In that respect the variation in the wall thickness of the preforms can be effected in dependence on the progress in respect of time of the extrusion operation.

In a particularly preferred feature the preforms are extruded between the opened portions of the tool which is closed around the preforms and moved away from under the extrusion devices.

Alternatively for example the preforms in web form can be respectively removed by means of a gripper at the extrusion device in question and transported to the tool.

In accordance with the invention it is provided that the preforms are respectively extruded between an outer mold and a central mold, that then the outer molds are closed against the central mold, the preforms are respectively caused to bear against the internal contour of the outer molds, the central mold is removed from between the outer molds and the outer molds are closed against each other in order to join together intermediate products which are disposed therein.

Although the above-described process is referred to as extrusion blow molding, the process is to be so interpreted that the preforms can also be caused to bear against the internal contour of the mold cavity by means of a reduced pressure. For that purpose it is known to provide suitable vacuum passages in the mold cavity at the internal contour of the tool.

It will be appreciated that the preforms can be extruded in a single-layer or multi-layer configuration, in which case for example the production of fuel tanks usually involves the use of six-layer extrudates which respectively include barrier layers for hydrocarbons.

DESCRIPTION OF THE DRAWINGS

The invention is described hereinafter by means of an embodiment by way of example illustrated in the drawings, in which.

DETAILED DESCRIPTION

Figure 1:
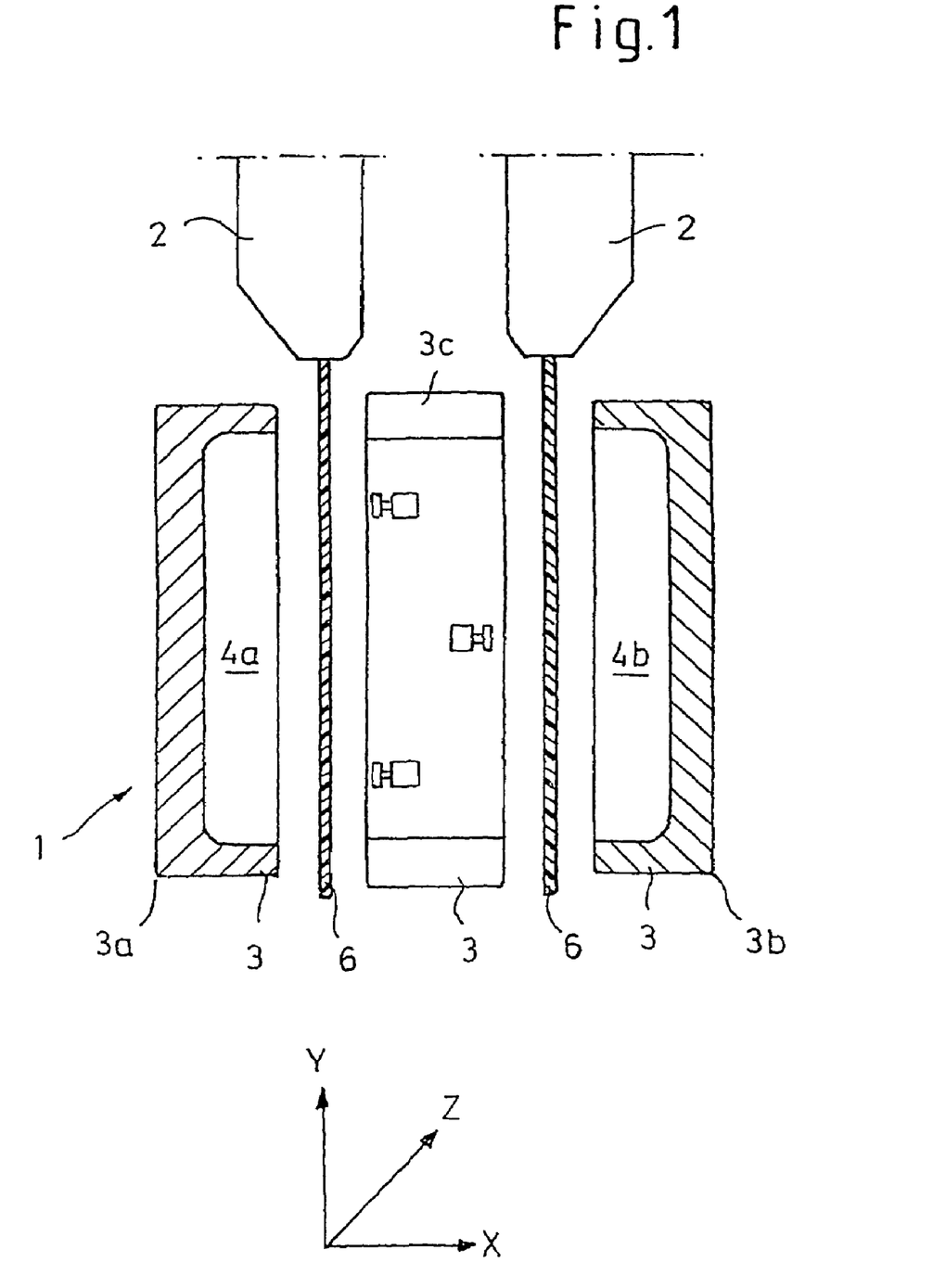
FIG. 1 is a diagrammatic side view of an extrusion blow molding apparatus for carrying out the process according to the invention.
Figure 2:
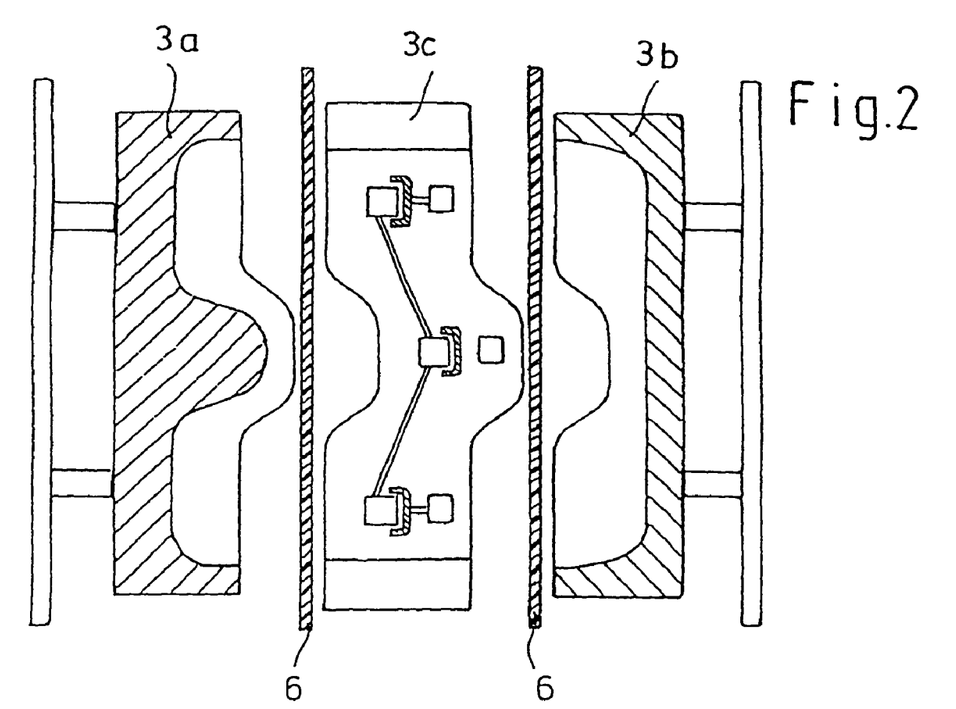
FIGS. 2-10 are cross-sections through the tool of the apparatus shown in FIG. 1 at various steps of the process according to the invention.
Figure 10:
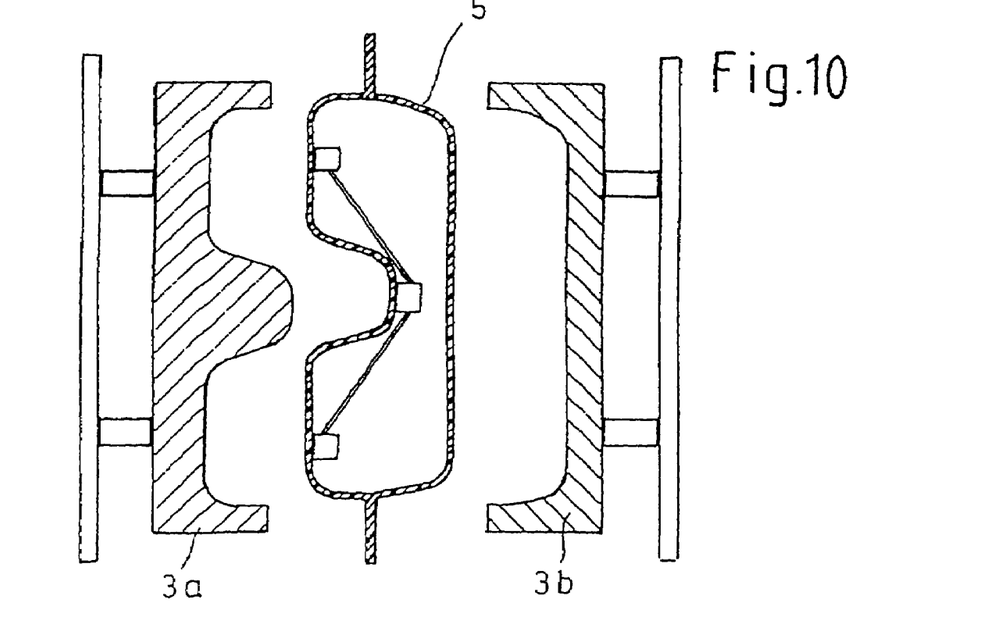

The extrusion blow molding machine 1 shown in FIG. 1 comprises two extrusion heads 2 with respectively associated extruders which are not illustrated. The extrusion heads 2 are arranged above a three-part tool 3 which is movable both into the plane of the drawing and also out of same. The tool 3 includes two outer molds 3a, 3b and a central mold 3c, wherein the outer molds 3a, 3b each have a respective cavity 4a, 4b which define the later external contour of the finished product 5. (See FIG. 10).

Figure 3:
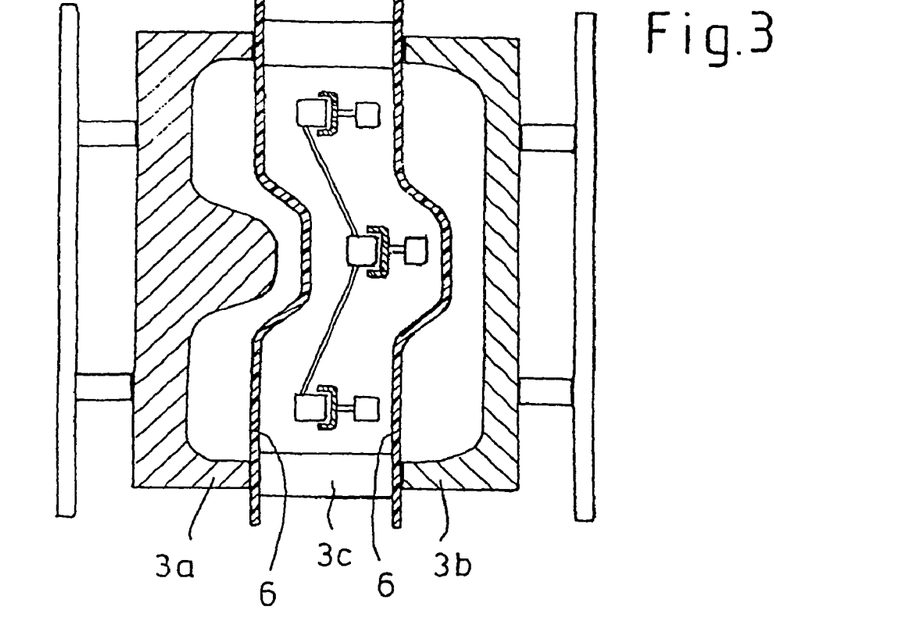

A preform 6 in web form of thermoplastic material is extruded in a hanging condition from each extrusion head 2. In the described embodiment of the invention the preforms are extruded between the respectively open outer molds 3a, 3b and the central mold 3c which are shown in the opened position in FIG. 1. As is diagrammatically illustrated hereinafter (See FIG. 3), the outer molds 3a, 3b are displaceable relative to each other and with respect to the central mold 3c by hydraulic drives within closing frame structures (not shown). Those details are known and are not shown here for that reason.

The entire assembly comprising the outer molds 3a, 3b and the central mold 3c can be displaced into and out of the plane of the drawing relative to the extrusion heads 2. In addition the central mold 3c can be displaced with respect to the outer molds 3a, 3b into and out of the plane of the drawing.

For the sake of simplicity that direction of movement into and out of the plane of the drawing is referred to hereinafter as the Z-direction.

The direction of the closing and opening movement of the outer molds 3a, 3b is referred to hereinafter as the X-direction and the extrusion direction as the Y-direction.

The production cycle begins in the position shown in FIG. 1 of the tool 3 beneath the extrusion head 2. As has already been mentioned hereinbefore, each preform 6 is extruded between a respective outer mold 3a, 3b and the central mold 3c. When the preform 6 has reached its full length, as is also shown in FIG. 1, the outer molds 3a, 3b are moved towards each other in the X-direction so that they clamp the preform against the central mold 3c (See FIG. 3).

Figure 4:
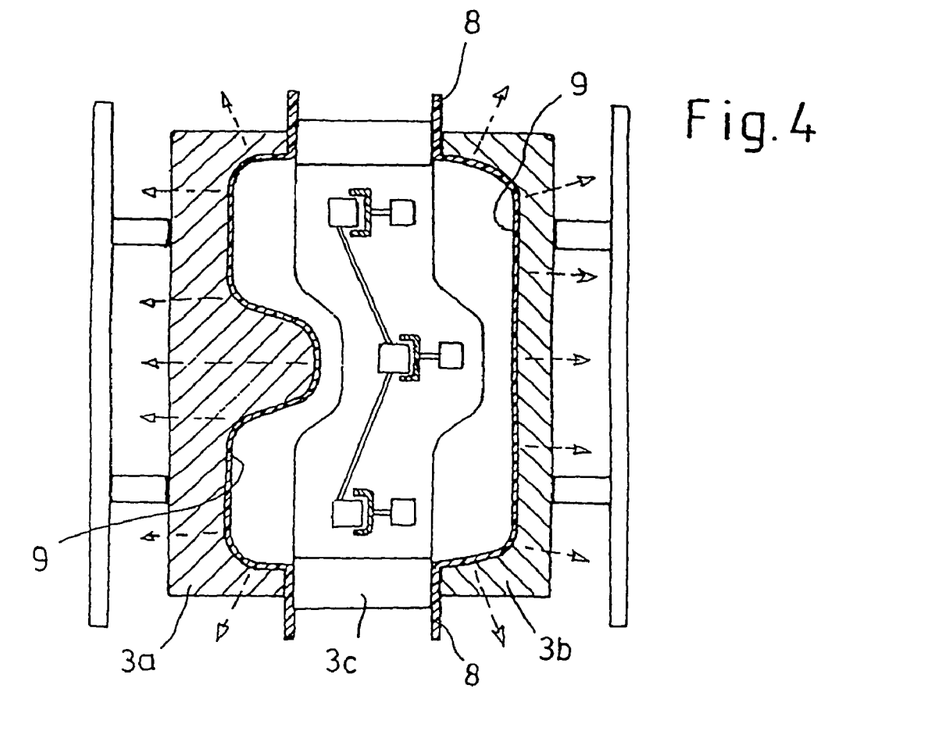
Figure 5:
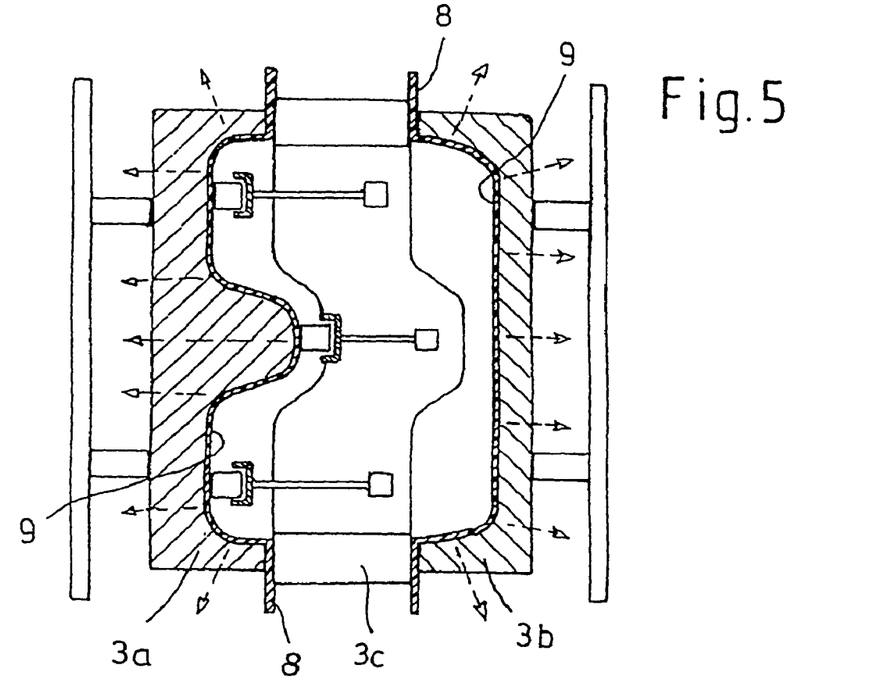
Figure 6:
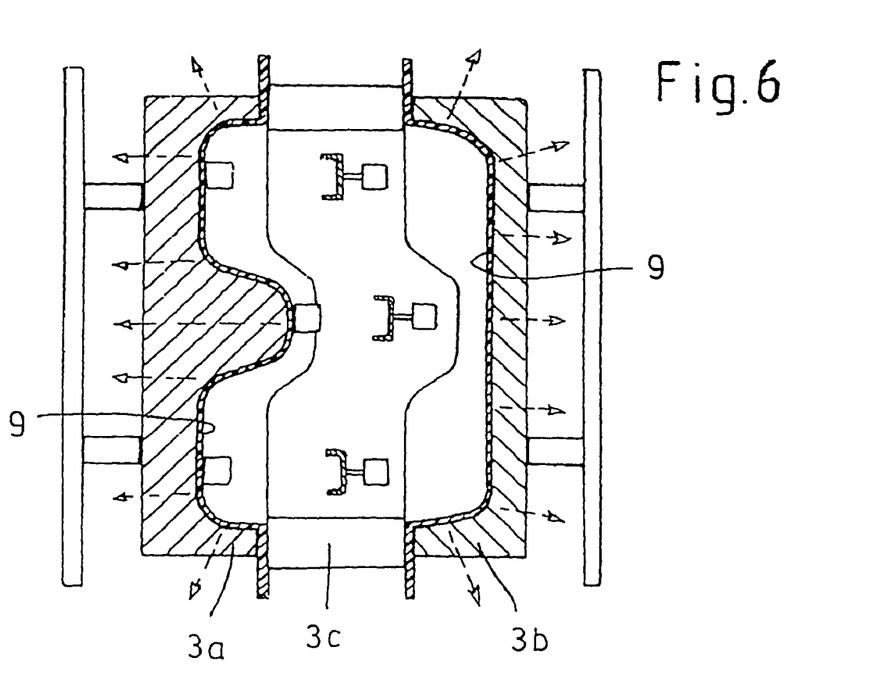

As the preforms are extruded continuously, the entire closed tool 3 is then moved away in the Z-direction from under the extrusion heads 2, principally in order not to impede the discharge of the following extrudate. At the same time or thereafter an increased internal pressure is produced in the mold cavity 7, for example by introducing compressed air or another suitable gas. (See FIG. 4). As support or alternatively the preforms 6 can be caused to bear against the internal contour of the cavities 4a, 4b by means of reduced pressure. The respective cavity 4a, 4b corresponds to the external contour of the product 5 in that region.

Provided in the central mold 3c are component holders which can be extended for the purposes of positioning built-in fitment components into the product 5, which holders will not be described in greater detail hereinafter. Built-in fitment components can be fixed to the inside wall of the product 5 with those component holders. When the product 5 is in the form of a fuel tank they can be for example valve mounting means or the like (See FIGS. 3-6).

Figure 7:
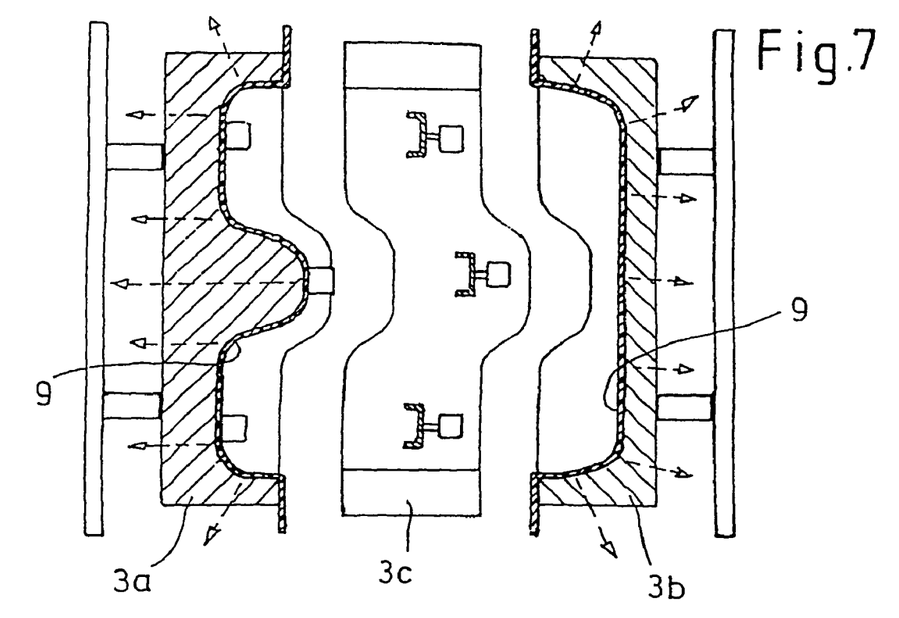
Figure 8:
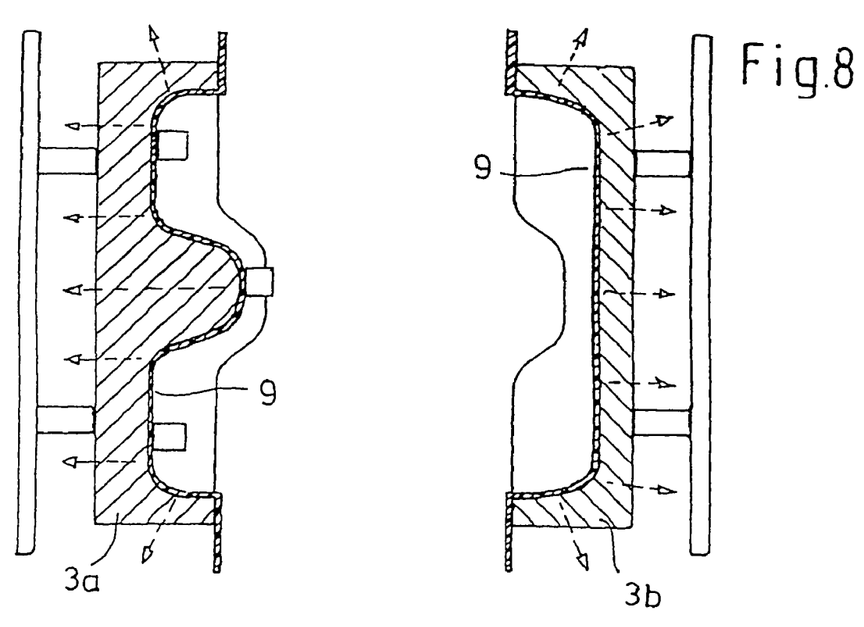
Figure 9:
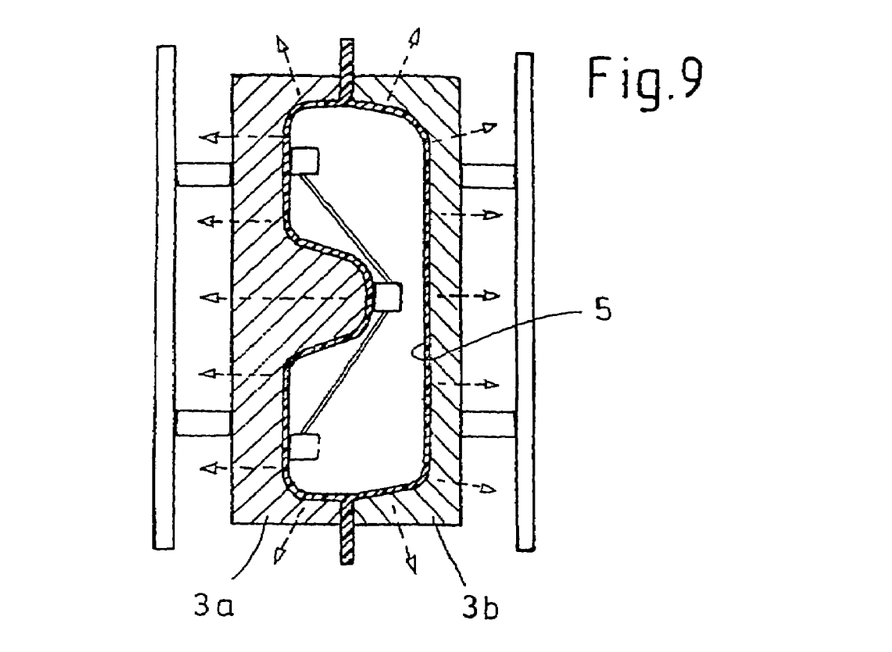

After the preforms 6 have been caused to bear against the inside wall of the respective cavity 4a, 4b and have been shaped out thereagainst, the outer molds 3a, 3b are moved away from each other in the X-direction (See FIG. 7) and the central mold 3c is moved out in the Z-direction between the outer molds 3a, 3b so that the condition illustrated in FIG. 8 is attained. The outer molds 3a, 3b are then closed against each other in the X-direction so that the edges 8, of a flange-like configuration, of the respective intermediate product 9 are welded together (See FIG. 9). The outer molds 3a, 3b are then opened and the product 5 can be removed (See FIG. 10).

The process according to the invention now provides that the wall thickness of each preform 6 is varied in accordance with a predetermined program, that is to say a thickness profile is imparted to the respective preform 6 both in the Y-direction and also in the Z-direction. Extrusion of the preforms 6 from the respective extrusion head 2 is effected synchronously, wherein a wall thickness profile is imparted either to one preform or also in relation to the preforms in dependence on time (in relation to the cycle time or extrusion time). In that situation the wall thickness profiles of the preforms 6 are controllable independently of each other so that for example it is possible to obtain an article which for example is thicker at one side than at the other side, without in that respect extrusion of the one side being influenced by the wall thickness variation at the other side.

Figure 11A:
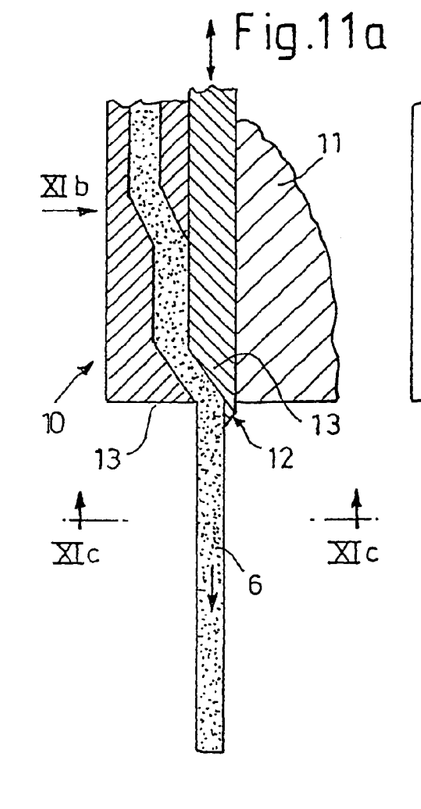
FIGS. 11a-11c are respective views of the nozzle of the extrusion head, partly in section, of a first variant of the nozzle gap adjustment.
Figure 11B:
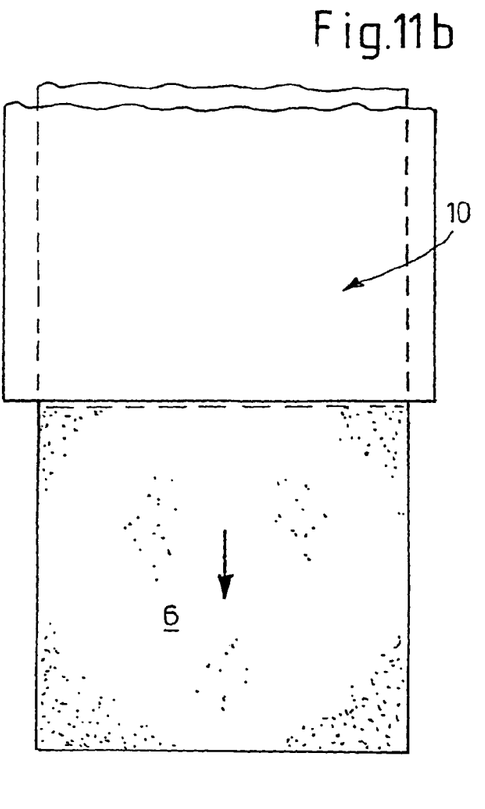
Figure 11C:
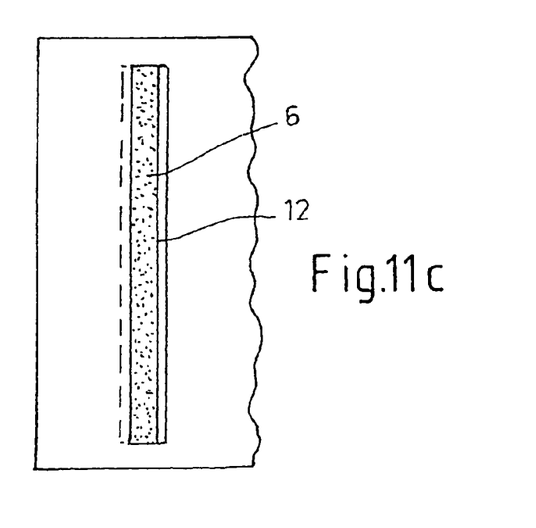
Figure 12A:
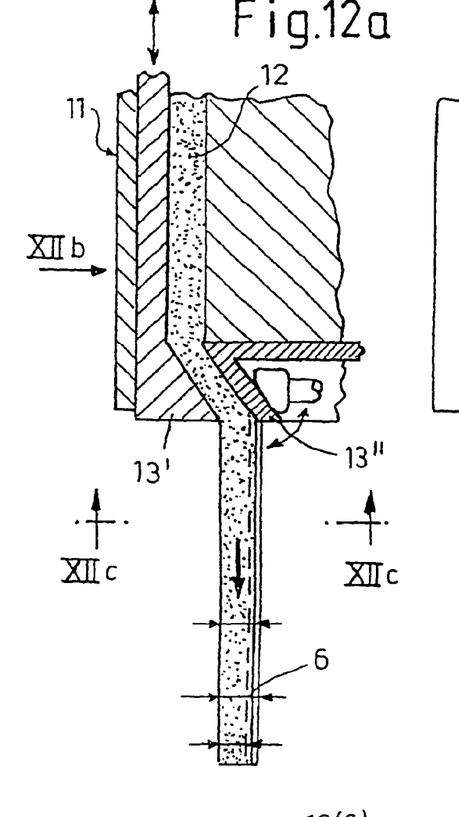
FIGS. 12a-12c are views of a nozzle, partly in section, with a second variant of nozzle gap adjustment.

Possible configurations of the nozzle 10 of the extrusion heads 2 are shown in each of FIGS. 11a and 12a respectively. They show a section through the nozzle region of the nozzle which is respectively in the form of a wide-slot nozzle. The nozzle 10 has a nozzle body 11 with, in the case of the embodiment shown in FIGS. 11a through 11c, two tool lips 13 delimiting a nozzle gap 12.

Adjustment of one of the tool lips 13 in the extrusion direction, that is to say in the Y-direction, causes the nozzle gap 12 to be narrowed or enlarged and thus causes a change in the wall thickness of the preform 6 in question. FIGS. 11a and 12a each show a section at a location of the nozzle body 11. The man skilled in the art will appreciate that the nozzle body 11 is adjustable in portion-wise manner in the Z-direction so that portion-wise adjustment of the nozzle gap 12 is possible, thereby providing for a variation in the wall thickness of the preform 6 in the Y-direction and the Z-direction respectively. (See FIGS. 11b and 11c). That portion-wise adjustment of the nozzle gap 12 can be implemented for example by the tool lips 13 being of a suitably pliable nature, with control elements which are not shown in FIGS. 11a through 11c acting on the tool lips.

Figure 12B:
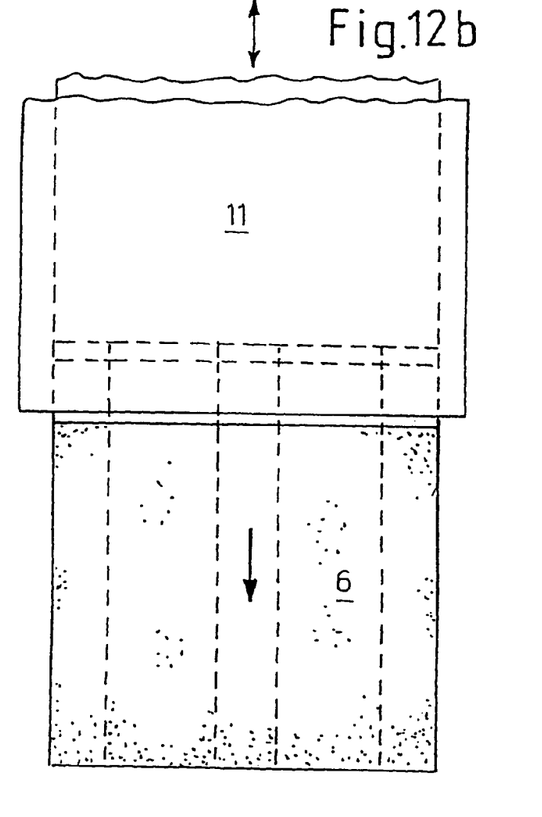
Figure 12C:
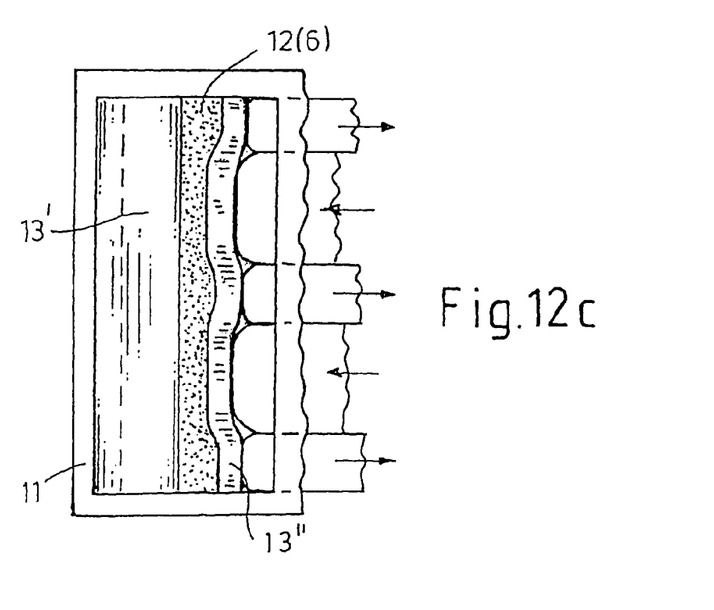

An alternative configuration of the nozzle body is shown in FIGS. 12a through 12c, in which a first tool lip 13' is displaceable uniformly over the entire depth of the nozzle gap 12, that is to say over the entire width of the preform, in the Z-direction, whereas a second tool lip 13" is in the form of a counterpart lip which is oppositely deformable in portion-wise manner in the Z-direction and is thus superimposed on the adjustment of the nozzle gap 12 by the tool lip 13'.

Various variations in that adjusting mechanism are possible in accordance with the invention.

LIST OF REFERENCES 1 extrusion blow molding machine
2 extrusion head
3 tool
3a, 3b outer molds
3c central mold
4a, 4b cavity
5 product
6 preform
7 mold cavity
8 edges
9 intermediate product
10 nozzle
11 nozzle body
12 nozzle gap
13 tools
13' tool lip
13" counterpart lip

The invention claimed is:

1. A process for the production of hollow bodies of thermoplastic material by extrusion blow molding, comprising:
   extrusion of at least two preforms in web form of plasticized material by means of a plurality of extrusion devices,
   wherein each of said at least two preforms are respectively extruded between an outer mold and a central mold, the outer molds each having a mold cavity,
   the outer molds are then closed to clamp the at least two preforms against the central mold,
   wherein said at least two preforms are jointly shaped within said mold cavities, wherein in a first step said at least two preforms are respectively caused to bear against a contour forming portion of the mold cavities by means of increased pressure and/or reduced pressure and are shaped out to form intermediate products,
   the central mold is then removed from between the outer molds and the outer molds are closed against each other, and
   in a second step the intermediate products are joined together to provide a hollow body,
   wherein a wall thickness profile is imparted to at least one preform during the extrusion operation independently of the respective other preform by nozzle gap adjustment during the extrusion operation.

2. A process as set forth in claim 1 wherein said wall thickness profile is effected in each case in accordance with a predetermined program.

3. A process as set forth in claim 2 wherein said wall thickness profile is imparted to the at least two preforms in the extrusion direction and/or transversely with respect to the extrusion direction.

4. A process as set forth in claim 1 wherein said at least two preforms are extruded from extrusion devices arranged in mutually parallel relationship and having wide-slot nozzles in a hanging condition (in the direction of the force of gravity).

5. A process as set forth in claim 1 wherein extrusion of said at least two preforms is effected synchronously in respect of the extrusion speed.

6. A process as set forth in claim 2 wherein the wall thickness profile of each of said at least two preforms is controlled independently of the other.

7. A process as set forth in claim 1 wherein said at least two preforms are extruded between the opened portions of the tool which is closed around said at least two preforms and moved away from under the extrusion devices.

* * * * *